Figure 1:
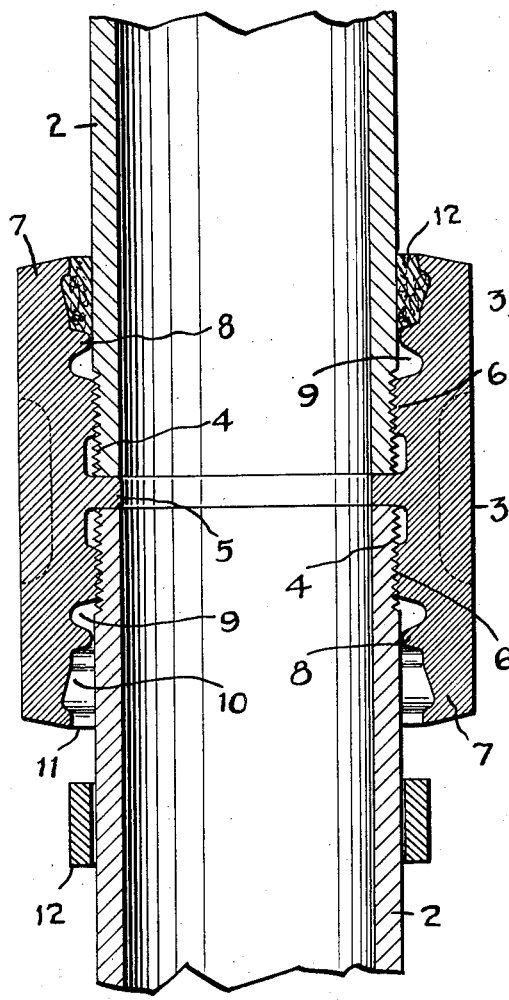

Nov. 29, 1932.   J. F. KIRBY   1,888,988
PIPE JOINT
Filed Feb. 11, 1930

INVENTOR
John F. Kirby
BY
Harry A. Yerkes, Jr.
ATTORNEY

Patented Nov. 29, 1932

1,888,988

UNITED STATES PATENT OFFICE

JOHN F. KIRBY, OF SOMERVILLE, NEW JERSEY

PIPE JOINT

Application filed February 11, 1930. Serial No. 427,468.

The invention relates to screw pipe joints and couplings.

The regular method of connecting pipe units by means of screw threads is illustrated by the familiar coupling having a continuous tapping from end to end, into which taper threadings on the pipe ends are screwed, the connection being completed only when the tapered threads have been screwed up to the extent practicable. The blocker coupling into which the threaded pipe ends are screwed is of the same inside diameter throughout, except, as required in drainage lines, where the necessity of providing a continuous passageway exists and a shoulder is consequently provided on the inside of the block equidistant from the ends, this shoulder being of the same thickness as the wall of the piping to be inserted.

In both cases, the tapping commences at the outer ends of the block, and as the connection is made entirely by the taper of the threads on the pipe units, the connection when completed necessarily leaves a portion of the threading on the pipe units exposed beyond the ends of the block.

The wall thickness of the piping units having been cut away from the end to a gradually decreasing degree throughout the length of the threading thereon, a primary weakness exists at the points of connection with the connecting block or coupling, and immediately behind the same, in direct proportion to the number of threads exposed. The greater the number of threads exposed the less the wall thickness remaining in the piping units at the ends of the coupling, the reduced wall thickness being compensated for only by the threads in the tapping within the connecting block or coupling. Because of the removal of protective coating against corrosion or other effect of the elements in the process of making the threads on the piping units, a further element of weakness exists against which no provision is made.

The objects of my invention are to make the piping as strong at the points of connection between the individual units as at any point within the units, to remove entirely the possibility of weakness resulting from the effect of the elements on exposed threadings, to make possible the making of connections between individual units of piping sufficiently strong to withstand any strain either from within or from without in the same measure as the pipe units themselves would withstand the strain, to secure flexibility, etc., to provide insurance against disconnected piping which might result from excessive shock or unforseen emergencies such as to destroy or impair the tapped and threaded connections, to facilitate the connecting of individual units of piping, so that the mechanic has less difficulty than ordinarily, and to secure these advantages without additional expense to the installation as a whole.

Figure 2:
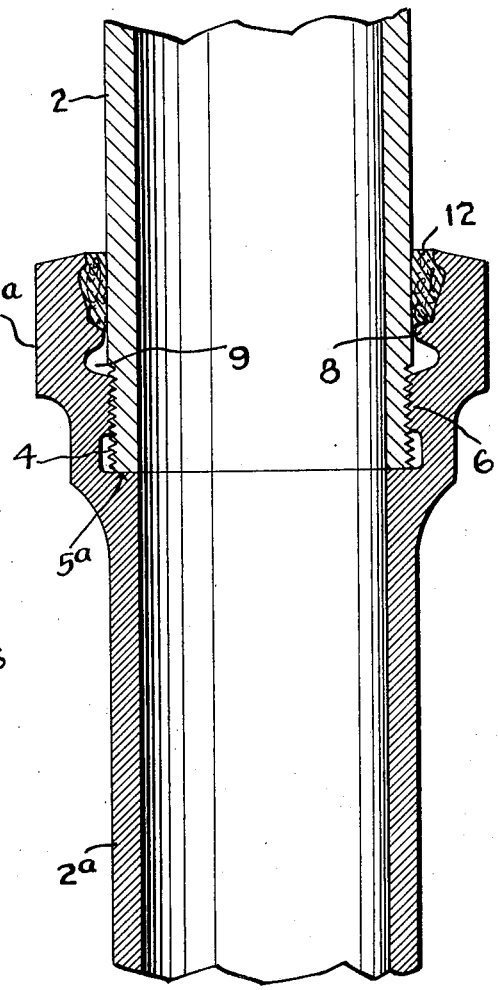

The improvements constituting the invention can best be described in connection with the accompanying drawing, wherein:

Fig. 1 is a longitudinal section through a form of the improved pipe joint utilizing a coupling, one of two fillets being shown in place and the other about to be applied; and Fig. 2 is a longitudinal section of a form of the improved pipe joint involving tapped and threaded ends on the pipe members.

In Fig. 1, two pipe members or units are each marked 2, and the coupling is marked 3. The threaded ends of the pipe units are marked 4.

The coupling may have a central internal rib 5 between the ends of the pipe units, and at opposite sides of this rib there are comparatively narrow tapped regions 6, which are engaged by the threads on the pipe ends.

These tapped regions are remote from the ends of the coupling. Beyond them recessed portions 7 of the coupling extend for a considerable distance over the plain cylindrical surfaces of the pipe members 2. Intermediate the ends of each of these recesses the coupling is formed with an internal rib 8 which extends into proximity to but out of contact with the surface of the pipe member which it encircles, there being a relatively narrow inner recess 9 between this rib and the tapped region 6, and a flaring outer recess 10 of greater width, having a terminal lip 11.

Rings 12 of lead or other malleable metal are calked into the recesses 9 and against the ribs 8. The fillets thus formed, filling the recesses and bearing tightly against the plain surfaces of the pipe, afford protection against seepage into the threaded connection where the lines involved are exposed to the elements or are installed underground or in submarine channels, also guarding against leakage outward from the conduit, and at the same time reinforce the connection between the piping units and provide an extended fulcrum or bearing, the rigid base of which, formed by the rib 8, does not normally bear against the pipe, but will do so under flexure before the elastic limit of the threads is exceeded.

This bearing or fulcrum against the plain surface of the pipe members, remote from their threads, transfers bending or other strains from the regions weakened by the threads to regions of full wall thickness, thereby securing the same degree of strength within and at the connection as obtains at any point in the line. Furthermore, the threads are completely enclosed.

If, because of some unusual shock or emergency strain which can not be foreseen breakage should occur within the coupling, the fulcrum will act as a holder for retaining the parts in position.

Fig. 2 shows the application of the invention to pipe units which have tapped and threaded ends. The pipe member 2ª has an enlarged end portion 3ª to receive threaded end 4 of the pipe member 2, this enlarged end having a basal internal shoulder 5ª against which the extreme end of the member 2 may abut. The tapped region of the part 3ª is marked 6, and the other features of the joint being like those shown in Fig. 1, and being marked with similar reference numerals, further description will not be necessary.

While the fillets are preferably produced with the aid of preformed rings of malleable metal which are calked into the recesses, any material suitable for the purpose of the invention may be employed and it may be introduced in a molten or fluid condition instead of by calking.

What is claimed as new is:

1. A pipe joint comprising a pipe member having a threaded end, and a tapped member wherein said threaded end is screwed, said tapped member having a recessed portion which extends over the plain cylindrical surface of said pipe member back of the threads and which is formed with an annular rib extending inward into proximity to but normally out of contact with the surface of said pipe member intermediate the ends of said recessed portion, and a fillet fixed into the outer recess and against said rib, forming a reinforcement which by its bearing against the plain surface of said pipe member transfers strain from the threaded portion to a comparatively remote region of the pipe member where full wall thickness obtains.

2. A pipe joint comprising a pipe member having a threaded end, and a tapped member wherein said threaded end is screwed, said tapped member having a recessed portion which extends over the plain cylindrical surface of said pipe member back of the threads and which is formed with an annular rib extending inward into proximity to but normally out of contact with the surface of said pipe member intermediate the ends of said recessed portion, and a fillet of malleable metal calked into the outer recess and against said rib, forming a reinforcement which by its bearing against the plain surface of said pipe member transfers strain from the threaded portion to a comparatively remote region of the pipe member where full wall thickness obtains.

3. A pipe joint comprising a pipe member having a threaded end, and a tapped member wherein said threaded end is screwed, said tapped member having a recessed portion which extends over the plain cylindrical surface of said pipe member back of the threads and which is formed with an annular rib extending inward into proximity to but normally out of contact with the surface of said pipe member intermediate the ends of said recessed portion, said recessed portion terminating in a lip, and a fillet fixed into the outer recess between said rib and said lip, forming a reinforcement which by its bearing against the plain surface of said pipe member transfers strain from the threaded portion to a comparatively remote region of the pipe member where full wall thickness obtains.

JOHN F. KIRBY.